Patented Aug. 18, 1953

2,649,159

UNITED STATES PATENT OFFICE 2,649,159

METHOD OF SEALING POROUS FORMATIONS

Jackson S. Boyer, Darby, Pa., assignor to Sun Oil Company, Philadelphia, Pa., a corporation of New Jersey No Drawing. Application February 24, 1951, Serial No. 212,691

10 Claims. (Cl. 166—22.)

This invention relates to a method of sealing subterranean porous formations traversed by a well borehole, and more particularly to a method wherein a sealing agent is introduced into a borehole and forced into a porous formation traversed by the borehole.

In the drilling of wells for oil, gas or other fluids, the well bore traverses numerous formations or strata of varied porosity, such as cavernous limestone, gravel beds, oil-bearing sands, cavernous sandstones, water-bearing sands, gas-bearing sands and the like. It is frequently necessary or desirable for one reason or another to seal off certain of these formations from the borehole and many methods for effecting such sealing have been proposed. In drilling by the rotary method a drilling mud is circulated during the general drilling operation down through the drill pipe to the drill bit and thence back to the surface to overcome the formation pressure, lubricate the bit, carry cuttings to the surface and to wall off the borehole. It is not infrequent, however, that formations are encountered which are sufficiently porous that the mud fluid passes into the formation so that little or no mud returns to the surface. This condition, which is known as "lost circulation," may also be due to a breakdown of one or more of the formations traversed, caused by the high hydrostatic pressure exerted by the mud column on the formation as when the mud fluid has been heavily weighted with weighting material. In such cases steps must be taken to seal off the porous formation and prevent the loss of mud fluid. Again, it is often desirable to plug off certain strata in order to prevent or minimize ingress of undesirable fluids into the well. For instance, it may be desired to seal off water-bearing sands to increase the ratio of oil to water production.

Formerly it was general practice to accomplish such sealing operations by pumping cement into the well, forcing it into the porous formation, permitting it to harden in place and drilling through the cement remaining in the borehole. Although in the case of lost circulation it has become customary more recently to add special sealing agents such as ground sugar cane stalks, mica or cellophane to the drilling fluid to improve its sealing properties, this has often proved unsuccessful, and consequently cementing operations are still used to an extent to overcome this condition. Since it is often impossible to determine the exact zone of lost circulation, a considerable amount of cement (sometimes five hundred feet or more) may have to be allowed to set within the borehole in order to insure sealing of the porous formation. It frequently happens that in drilling through the hardened cement the hole becomes sidetracked into the adjacent formations, thus requiring redrilling of all the hole below the point of sidetracking, perhaps including the zone of lost circulation. Similar disadvantages accompany the use of cement in sealing off water sands. A further disadvantage may arise due to the possibility that, in some cases, the cement may be forced into the oil-bearing formation to a distance sufficient to make it difficult or impossible subsequently to open the formation for production by the usual gun perforation methods.

More recently the use of resin-forming liquids capable of condensing to a solid resin under the influence of the formation temperature in place of cement has become known and has attained a limited applicability particularly in sealing water-bearing sands. While such resin-forming liquids offer certain advantages over cement, such as greater fluidity resulting in improved sealing properties and better resistance to natural brines and to acid such as used in acidizing wells, they fail to overcome the above discussed disadvantages which accompany the use of cement. Like cement, these resin-forming liquids solidify in the borehole, necessitating redrilling of that portion of the hole which thereby becomes plugged. Also, due to the greater fluidity of the resin-forming liquids as compared to cement, they are even more apt to penetrate an oil-bearing stratum to such extent that subsequent opening of the stratum for production becomes impossible. A further disadvantage of this type of sealing agent arises when there are substantial variations in penetrability of the earth surrounding the portion of the borehole to be sealed off, as occurs in the case of a highly porous formation adjacent to a less porous formation or as may be caused by crevices within a formation. In such cases a very large amount of the resin-forming liquid may be forced into the more penetrable portions of the surrounding earth before an effective seal of the less penetrable portions is obtained, with the result that the expense involved in carrying out the sealing operation becomes excessive.

The present invention provides an improved method of sealing subterranean porous formations which method overcomes the above-discussed disadvantages of prior art sealing methods involving introduction into a borehole of cement or resin-forming liquid.

According to the present invention, a fluid suspension as hereinafter specified of solid material in liquid material is introduced into a well borehole and forced into a porous formation traversed by the borehole. The suspension used comprises solid material and liquid material which are condensible together to form a thermosetting resin, and the solid material is capable of being filtered from the suspension when the suspension is forced into a bed of 10–16 mesh (U. S. Standard scale) sand.

When suspensions as subsequently specified are forced into a porous subterranean formation, the solids in the suspension are filtered from the suspension and form a filter cake at the face of the porous formation, the filter cake comprising a compact mass of solid particles uniformly wetted with liquid material. According to the present invention, the filter cake thus formed is subjected to the heat of the elevated temperature normally occurring at the formation locus. In some cases, when this is done, the filter cake hardens to form at the face of the porous formation a mechanically strong, rigid solid layer which is substantially impervious to drilling fluid. In other cases, the filter cake first fuses and penetrates somewhat into the formation, then hardens in the formation, in effect thus consolidating the bed and providing an effective seal by making the sand bed impervious to drilling fluid.

The fluid suspension which according to the present invention is introduced into a well hole, comprises solid material which, though it is condensible with the carrier liquid to form a thermosetting resin, is nevertheless not yet condensed to any substantial degree. The condensation of the solid material with the liquid material to form a thermosetting resin substantially all takes place after the suspension has been introduced into the well hole. Formation of a heat-hardened solid material sealing off the porous formation occurs in condensation and cross-linking reactions which take place after a compact mass of solid particles wetted with the carrier liquid has been formed by filtration of the sealing agent through the porous formation.

Examples of suspensions which can be used according to the invention are: suspensions of solid polyfunctional amines such as melamine, urea, or thiourea in formalin or furfural, and suspensions of solid phenolic materials such as resorcinol, pyrogallol, or catechol (pyrocatechol) in formalin or furfural. Filter cakes comprising polyfunctional amines as specified above harden upon heating to give a hard layer at the face of the porous formation. On the other hand, filter cakes comprising solid phenolic materials as specified above fuse and penetrate somewhat into the porous formation before hardening. The above suspensions are representative of suspensions wherein the solid material is condensible with the liquid material to form a thermosetting resin.

The term formalin, where used in the present specification is intended to indicate an aqueous solution of formaldehyde. Formalin generally contains about 40 percent formaldehyde, but other concentrations can be used.

Suspensions used according to the present invention must contain undissolved solids in substantial proportion, but must also be fluid, i. e. capable of flowing through conduits, pumps, etc., and must also have suitable filtering properties in that the solid material can be filtered out from the suspension by forcing the suspension into a bed of 10–16 mesh sand. It has been found that suspensions having these combinations of characteristics can be prepared from suitable solid and liquid materials by agitating the solid material with the liquid material to obtain a suspension of finely divided solid material in liquid material. The particle size distribution of the finely divided solid material and the ratio of solid material to liquid material are interdependent factors determining the suitability of a suspension for use according to the present invention. Generally speaking, filtering properties improve with increasing particle size and increasing ratios of solid to liquid, whereas fluidity improves with decreasing particles size and decreasing ratios of solid to liquid. Whether the liquid material is formalin or furfural is another factor affecting the properties of the suspension, since furfural is more viscous than formalin. Generally speaking, solid material suspended in furfural tends to filter out more readily when the suspension is forced into a porous formation than does solid material suspended in formalin, probably because the higher viscosity of the furfural makes it easier for the solid particles to "bridge" and start a filter cake at the face of the formation.

Generally, suspensions of solid particles in liquid are sufficiently fluid for use according to the present invention if the weight ratio of solid to liquid is substantially less than 2. In some cases weight ratios higher than 2 can be used, particularly if the liquid is formalin. The above weight ratio specification is particularly applicable when the major proportion of the solid particles in the suspension are small enough to pass through a 10 mesh U. S. Standard screen.

Generally, suspensions of solid particles according to the invention in formalin have suitable filtering properties if a major proportion of the particles are large enough to be retained on a 170 mesh U. S. Standard screen, and if the ratio of solid to formalin is substantially greater than 0.33.

Generally, suspensions of solid particles according to the invention in furfural have suitable filtering properties if the ratio of solid to furfural is greater than 0.2.

The above particle size and weight ratio specifications are subject to modification in different instances, depending on the nature of the solid material, the pH of the liquid, etc. The exact combination of particle size and ratio of solid to liquid can be determined, in the light of the present specification, by a person skilled in the art. A prepared suspension can be tested for fluidity by visual observation of its viscosity; and whether or not solids will filter out from the suspension when the suspension is forced into 10–16 mesh sand can be determined by a simple laboratory test as subsequently described in connection with the examples.

According to the present invention, suspensions of finely divided solids in liquid material are used. The actual range of particle sizes in mixtures of solids used according to the invention is not critical, but it has been found that particularly good sealing of porous subterranean formations is obtained when a major proportion of the mixture of solid particles in the suspension used as sealing agent are small enough to pass a 10 mesh U. S. Standard screen, and when a major proportion of those solid particles are large enough to be retained on a 170 mesh screen. When the solid material meets these preferred particle size specifications, they filter out particularly satisfactorily from the sealing agent, and the filter cake hardens upon heating to give a particularly good hard sheath sealing off the porous formation.

In carrying out the sealing operation, a batch of the sealing agent is pumped into the well and to a point adjacent the desired formation, a packer being used if desired or necessary to place the sealing agent at the proper location. Before introducing the sealing agent into the well, a catalyst may be added, if desired, to regulate the cure time of the resin to a suitable value in accordance with the temperature of the formation. Sufficient pressure is applied to the sealing agent to overcome the formation pressure and cause filtration of the suspension into the formation, whereby the dispersed solid particles filter out at or near the face of the formation. The resulting filter cake is held in place by maintaining the pressure until it has had sufficient time to cure to a hard non-porous sheath, thereby effectively plugging off the formation from the borehole. The curing of the filter cake is believed to occur through condensation of the solid particles therein with the liquid remaining in the filter cake. While maintaining the pressure on the resin layer during curing, the suspension remaining within the bore-hole may be flushed out by circulating a slow stream of water down through the drill pipe and up through the annular space between the drill pipe and the borehole.

The suspensions of the present invention have the great advantage over previously known sealing agents of not forming a difficultly drillable solid mass within the well bore. While the solid particles of the suspension which remains in the borehole may coalesce to an extent with time, the coalesced solid upon curing under borehole conditions does not become the hard solid mass that is obtained when a resin-forming liquid or cement is used as the sealing agent. Furthermore, after the solid layer has been plastered out on the borehole wall, setting of unplastered solid to a rigid mass within the borehole may be minimized or prevented by flushing out the suspension before the solid has had time to cure. This may be accomplished by circulating a stream of water into and out of the borehole, preferably slowly to insure against the possibility of flushing out part of the plastered solid layer. The solid layer remaining on the borehole wall and slightly penetrating the adjacent formation cures under the formation temperature to a hard non-porous sheath which generally may be of the order of one-quarter to one inch thickness. Thus, any oil-bearing stratum which has been sealed off may readily be opened up for production by the usual gun perforation method.

The following examples are presented to demonstrate the properties of sealing agents used according to the invention, which properties make them suitable for such use. In these examples, a laboratory test was used to indicate whether or not the suspension tested had suitable filtering properties, i. e. whether the solids in the suspension were capable of being filtered from the suspension to form a filter cake at the face of a porous formation. The test involved forcing the suspension through a sand bed consisting of sand particles small enough to pass a 10 mesh U. S. Standard screen and large enough to be retained on a 16 mesh U. S. Standard screen. If a layer of solids from the suspension was formed on top of the sand bed, it was concluded that the suspension is generally suitable for use as a sealing agent according to the present invention. If no layer of solids was formed on top of the bed, it was concluded that the suspension is not generally suitable. It is to be understood, of course, that subterranean porous formations do not necessarily conform in porosity to 10–16 mesh sand; nevertheless, the above described laboratory test is generally indicative of the suitability of suspensions for use according to the present invention, with the understanding that formations having greater porosity than that of 10–16 mesh sand will require the use of a sealing agent having somewhat better filtering properties.

*Example I*

In this example, suitable weight ratios of solid to liquid in suspensions of one mixture of particles of finely divided melamine in formalin were determined by preparing and testing various suspensions having different weight ratios. The melamine used was a mixture of particles all of which were small enough to pass a 10 mesh screen and a major proportion of which were large enough to be retained on a 170 mesh screen. A U. S. Standard screen analysis of the melamine used is given as follows:

| Weight Percent | Passes | Is Retained On |
| --- | --- | --- |
| 0.8 | 20 mesh screen | 40 mesh screen. |
| 31.1 | 40 mesh screen | 70 mesh screen. |
| 0.5 | 70 mesh screen | 80 mesh screen. |
| 1.9 | 80 mesh screen | 100 mesh screen. |
| 5.1 | 100 mesh screen | 140 mesh screen. |
| 15.7 | 140 mesh screen | 170 mesh screen. |
| 5.2 | 170 mesh screen | 230 mesh screen. |
| 1.8 | 230 mesh screen | 270 mesh screen. |
| 2.3 | 270 mesh screen | 325 mesh screen. |
| 32.3 | 325 mesh screen | |
| 3.3 | Lost in screening | |
| 100.0 | | |

A plurality of suspensions of melamine as specified above in a commercial grade of formalin were prepared, the proportions of melamine to formalin being different in each suspension. Each suspension was tested for its ability to form a melamine filter cake on top of a bed of 10–16 mesh sand. The following table gives the results obtained with each suspension:

| Weight Ratio Melamine to Formalin | Behavior When Suspension is Forced Through 10–16 Mesh Sand |
| --- | --- |
| 1.0 | Forms filter cake. |
| 0.5 | Do. |
| 0.33 | Does not form filter cake. |

These results show that, when preparing a sealing agent from the melamine and formalin specified above, the weight ratio of melamine to formalin should not be as low as 0.33.

The above-described suspensions are all fluid enough to be transported and used satisfactorily according to the requirements of use as sealing agents. These suspensions are also capable of being stored for substantial periods of time without losing their fluidity. Solids settle out from the suspensions upon standing, but are readily redispersed by agitation.

In contrast to the above-described suspensions, a suspension having a weight ratio of melamine as specified above to formalin of 2.0 was found to be initially fluid enough for use as sealing agent, but to lose its fluidity upon standing. Therefore, suspensions having such high ratios of melamine to formalin are not suitable for use according to the invention unless they are used within a few hours after preparation. Suspensions having a weight ratio of melamine to formalin of 4.0 were found to be too viscous, even as initially prepared, to be satisfactorily handled in use according to the present invention. Accordingly, it was concluded that when using melamine conforming to that used in the above tests, the weight ratio of melamine to furfural should not be as high as 4.0, and preferably should not be as high as 2.0.

A filter cake obtained by forcing into 10–16 mesh sand a suspension of one part by weight of melamine as specified above in one part by weight of commercial formalin was heated to 100° C. for 11 hours while maintaining on the filter cake a differential hydrostatic pressure of 500 pounds per square inch. After such heating, the cake was found to have hardened to a mechanically strong, very hard solid having no porous structure visible to the unaided eye. This test shows that conditions, such as frequently occurs at underground porous formations traversed by oil well boreholes, cause filter cakes, obtained by filtering a sealing agent according to the invention through a porous formation, to harden and produce an effective seal of the porous formation.

The formalin used in the above-described suspensions was a commercial grade of formalin and was slightly acidic in reaction. Another suspension was prepared by agitating together one part by weight of melamine as specified above and one part by weight of neutralized formalin prepared by neutralizing commercial formalin with caustic soda. It was found that this suspension forms a filter cake when forced through 10–16 mesh sand. However, upon standing, this suspension tends to lose its fluidity.

The above result obtained with neutralized formalin in a suspension having a 1.0 weight ratio of melamine to formalin, as compared with results obtained with commercial formalin at the same ratio, indicates that the higher pH of the neutralized formalin makes it preferable to use somewhat lower weight ratios of melamine to formalin when the formalin has been neutralized.

It is to be understood that the preferred ranges of melamine to formalin determined in the above example are subject to variation, not only with the pH of the formalin used, but also with the particle size of the melamine used.

Example II

In this example, suitable weight ratios of solid to liquid in suspensions of finely divided urea in furfural were determined by preparing and testing various suspensions having different weight ratios. Each suspension was tested for its ability to form a urea filter cake on top of a bed of 10–16 mesh sand. The following table gives the results obtained with each suspension:

| Weight Ratio Urea to Furfural | Behavior When Suspension Is Forced Through 10–16 Mesh Sand |
| --- | --- |
| 1.0 | Forms filter cake. |
| 0.33 | Do. |

The weight ratio of urea to furfural can be lower than 0.33, but is preferably not as low as 0.2.

The above suspensions all had satisfactory properties as regards fluidity and ease of handling. In contrast to those suspensions, a suspension having a weight ratio of urea to furfural of 2.0 was found to be too viscous to be satisfactorily handled in use according to the present invention. Therefore, it was concluded that when using urea conforming to that used in the above tests, the weight ratio of urea to furfural should not be as high as 2.0.

Example III

In this example, suitable weight ratios of solid to liquid in suspensions of one mixture of particles of finely divided thiourea in formalin were determined. The thiourea used was a mixture of particles all of which were small enough to pass a 10 mesh screen and a major proportion of which were large enough to be retained on a 170 mesh screen. A U. S. Standard screen analysis of the thiourea used is given as follows:

| Weight Percent | Passes | Is Retained On |
| --- | --- | --- |
| 2.0 | 10 | 16 |
| 0.8 | 16 | 20 |
| 69.1 | 20 | 40 |
| 16.9 | 40 | 70 |
| 1.8 | 70 | 80 |
| 2.8 | 80 | 100 |
| 2.4 | 100 | 140 |
| 1.1 | 140 | 170 |
| 1.7 | 170 | 230 |
| 1.2 | 230 | ---------- |
| 0.2 | (¹) | ---------- |
| 100.0 | | |

¹ Lost in screening.

A plurality of suspensions of thiourea as specified above in a commercial grade of formalin were prepared, the proportions of thiourea to formalin being different in each suspension. Each suspension was tested for its ability to form a thiourea filter cake on top of a bed of 10–16 mesh sand. The following table gives the results obtained with each suspension:

| Weight Ratio Thiourea to Formalin | Behavior When Suspension is Forced Through 10–16 Mesh Sand |
| --- | --- |
| 1.33 | Forms filter cake. |
| 1.0 | Do. |
| 0.5 | Do. |
| 0.33 | Does not form filter cake. |

These results show that, when preparing a sealing agent from thiourea conforming to that used in the above tests, the weight ratio of thiourea to formalin should not be as low as 0.33.

The above suspensions all have suitable properties as regards fluidity and ease of handling. However, the suspension with 1.0 weight ratio has a disadvantageous property in that the thiourea tends to dissolve in the formalin upon standing. Therefore, suspensions conforming substantially to that suspension are not suitable for use according to the invention unless they are used within a few hours after preparation. Therefore, it is preferred that, when preparing a sealing agent from thiourea conforming to that used in the above tests, the weight ratio of thiourea to formalin not be as low as 1.0.

Another suspension having a weight ratio of thiourea as specified above to formalin of 2.0 was found to be too viscous to be satisfactorily handled in use according to the invention. Accordingly, it was concluded that when using thiourea having particle sizes as specified above, the weight ratio should not be as high as 2.0.

To determine the effect of using neutralized formalin instead of commercial formalin, a suspension was prepared by agitating together one part by weight of thiourea as specified above and one part by weight of neutralized formalin. The resulting suspension formed a filter cake when forced through 10–16 mesh sand and was found to be free from any substantial tendency for the thiourea to dissolve upon standing. This result shows that the use of neutralized formalin makes it possible to obtain relatively dilute suspensions which show no substantial tendency for thiourea to dissolve on standing.

*Example IV*

In this example, suitable weight ratios of solid to liquid in suspensions of finely divided thiourea, as previously specified, in furfural were determined. The following table shows the results obtained with various suspensions having different weight ratios of thiourea to furfural:

| Weight Ratio Thiourea to Furfural | Behavior When Suspension is Forced Through 10-16 Mesh Sand |
| --- | --- |
| 1.0 | Forms filter cake. |
| 0.0667 | Do. |
| 0.0625 | Does not form filter cake. |

Thus the weight ratio of thiourea conforming to that specified should not be as low as 0.0625.

A suspension having a weight ratio of thiourea to furfural of 2.0 was found to be too viscous to be satisfactorily handled.

*Example V*

In this example, suitable weight ratios of solid to liquid in suspensions of finely divided resorcinol in formalin were determined. A plurality of suspensions of resorcinol in commercial formalin were prepared with different proportions of resorcinol to formalin in each. Each suspension was tested for its ability to form a resorcinol filter cake on top of a bed of 10–16 mesh sand. The following table gives the results obtained with each suspension:

| Weight Ratio Resorcinol to Formalin | Behavior When Suspension is Forced Through 10-16 Mesh Sand |
| --- | --- |
| 3.0 | Forms filter cake. |
| 2.0 | Do. |
| 1.0 | Does not form filter cake. |

These results show that, when preparing a sealing agent from resorcinol conforming to the above, the weight ratio of resorcinol to formalin should not be as low as 1.0.

The above suspensions all had satisfactory properties as regards fluidity and ease of handling. In contrast to these suspensions, a suspension having a weight ratio of resorcinol to formalin of 4.0 was found to be too viscous to be satisfactorily handled. Therefore, it was concluded that when using resorcinol conforming to the above, the weight ratio of resorcinol to formalin should not be as high as 4.0

*Example VI*

In this example, suitable weight ratios of solid to liquid in suspensions of finely divided resorcinol in furfural were determined. The following table shows the results obtained with various suspensions having different weight ratios of resorcinol to furfural:

| Weight Ratio Resorcinol to Furfural | Behavior When Suspension Is Forced Through 10-16 Mesh Sand |
| --- | --- |
| 3.0 | Forms filter cake. |
| 0 | Do. |
| .2 | Do. |
| .17 | Does not form filter cake. |

Thus, the weight ratio of resorcinol to formalin should not be as low as 0.17.

A suspension having a weight ratio of resorcinol to formalin of 4.0 was found to be too viscous to be satisfactorily handled.

In all the above examples, it is to be understood that the limits determined for the ratio of solid to liquid are subject to variation with the particle size of the solids used and possibly also with other variables, such as the pH of the liquid used.

In carrying out the method of the present invention, care should be taken to guard the operators from the possible harmful affects of handling of materials such as formalin or furfural. Where possible, the liquid should be handled in closed equipment to minimize pollution of the atmosphere with objectionable vapors. In my copending application Serial No. 212,692, filed February 24, 1951, there is disclosed and claimed a method of preparing a rigid porous solid material by condensing by heat a compact mass of melamine particles wetted with formalin, substantially in the absence of compression of the compact mass during the condensing. In my copending application Serial No. 212,693, filed February 24, 1951, there is disclosed and claimed a method of preparing a rigid porous solid material by condensing by heat a compact mass of thiourea particles wetted with either formalin or furfural substantially in the absence of compression of the compact mass during the condensing. The present invention contemplates in part the underground condensing by heat of such wetted compact masses, but under conditions to substantially compress the compact mass during the condensing. The method of the present invention, by virtue of the pressure and other conditions, obtains, at the face of or within a porous formation, a rigid solid material substantially impervious to drilling fluid.

Where formalin and furfural are disclosed in the present application, it is to be understood that other liquid aldehydes condensible with the solid material in the suspension to form a thermosetting resin can be used in their place.

I claim:

1. The method of sealing a porous formation traversed by a well borehole which comprises: introducing into said borehole a fluid sealing agent comprising a gross suspension of particles of solid material in liquid material, said solid material being selected from the group consisting of melamine, urea, thiourea, resorcinol, pyrogallol, and catechol, and said liquid material comprising an aldehyde condensible with said solid material to form a thermosetting resin, and said solid material being filterable from said suspension when said suspension is forced into a bed of 10 mesh sand; applying pressure on said sealing agent against the porous formation to force liquid material from the sealing agent into said formation, thereby filtering out a compact sheath, comprising the solid material wetted with the liquid material, on the borehole wall adjacent the formation; and permitting the sheath to condense under the influence of well temperature and pressure to form a hard resin layer substantially impervious to drilling fluid.

2. Method according to claim 1 wherein said solid material is melamine.

3. Method according to claim 2 wherein said liquid is formalin.

4. Method according to claim 1 wherein said solid material is urea.

5. Method according to claim 1 wherein said solid material is thiourea.

6. Method according to claim 5 wherein said liquid is furfural.

7. Method according to claim 1 wherein said solid material is resorcinol.

8. The method of sealing a porous formation traversed by a well bore which comprises: introducing into said borehole a fluid sealing agent comprising a gross suspension of particles of solid material in liquid material, said solid material being selected from the group consisting of melamine, urea, thiourea, resorcinol, pyrogallol, and catechol, and said liquid material being selected from the group consisting of formalin and furfural, and said solid material being filterable from said suspension when said suspension is forced into a bed of 10 mesh sand; applying pressure on said sealing agent against the porous formation to force liquid material from the sealing agent into said formation, thereby filtering out a compact sheath, comprising the solid material wetted with the liquid material, on the borehole wall adjacent the formation; and permitting the sheath to condense under the influence of well temperature and pressure to form a hard resin layer substantially impervious to drilling fluid.

9. Method according to claim 8 wherein said liquid is formalin.

10. Method according to claim 8 wherein said liquid is furfural.

JACKSON S. BOYER.

References Cited in the file of this patent
UNITED STATES PATENTS

| Number | Name | Date |
|---|---|---|
| 2,345,611 | Lerch et al. | Apr. 4, 1944 |
| 2,349,181 | Lerch et al. | May 16, 1944 |
| 2,457,160 | Kurtz et al. | Dec. 28, 1948 |
| 2,556,169 | Crouch et al. | June 12, 1951 |